US005455318A

United States Patent [19]
Štohandl et al.

[11] Patent Number: 5,455,318
[45] Date of Patent: Oct. 3, 1995

[54] METHOD OF PRODUCTION OF POLYMERS AND COPOLYMERS OF CYCLOALKENE OF NORBORNENE TYPE

[75] Inventors: Jiří Štohandl, Bobrová; Pavel Vozka; Irena Vařeková, both of Brno; Miroslav Karafiát, Střelice; Jiří Ondůj; Jiří Mejzlík, both of Brno; Hynek Balcar, Praha; Kamil Štěpánek, Most; Gerhardt Heller, Litvínov; Jaromír Lederer, Teplice, all of Czechoslovakia

[73] Assignee: Chemopetrol, s.p. Litvinov, Vyzkumny ustav makromolekularni chemie, Brno, Czechoslovakia

[21] Appl. No.: 104,168
[22] PCT Filed: Dec. 16, 1992
[86] PCT No.: PCT/CS92/00034
§ 371 Date: Oct. 15, 1993
§ 102(e) Date: Oct. 15, 1993
[87] PCT Pub. No.: WO93/12158
PCT Pub. Date: Jun. 24, 1993

[30] Foreign Application Priority Data

Dec. 16, 1991 [CS] Czechoslovakia ................ 3808-91

[51] Int. Cl.⁶ .................. C08F 4/22; C08F 4/78
[52] U.S. Cl. .......... 526/141; 502/167; 526/281; 526/283; 526/284
[58] Field of Search ................. 526/141, 281, 526/283, 284; 502/167

[56] References Cited

U.S. PATENT DOCUMENTS

| | | | |
|---|---|---|---|
| 3,691,095 | 9/1972 | Kroll et al. | |
| 4,080,491 | 3/1978 | Kobayashi | 526/137 |
| 4,882,401 | 11/1989 | Bell | 526/119 |
| 4,883,849 | 11/1989 | Matlack | 526/141 |
| 5,171,776 | 12/1992 | Khasat | 529/518 |
| 5,268,232 | 12/1993 | Khasat | 428/521 |

FOREIGN PATENT DOCUMENTS 0376199 7/1990 European Pat. Off. .

OTHER PUBLICATIONS

*Chemical Abstracts*, vol. 93, No. 6, Aug. 1980, Columbus, Ohio, US; abstract No. 47280, T. T. Denisova et al. "activating effect of stable phenoxyl and piperidinoxyl radicals on the polymerisation of cyclopentene and cyclooctene with ring opening" p. 5; column 2; & Vysokomol. Soedin. Ser. B., vol. 22, No. 4, 1980, pp. 243–246.

*Database WPIL*, Derwent Publications Ltd., London, GB; AN 81–14958 & SU,A,733 714 (Sarat Univ Chem Inst and as USSR Chem Phys Inst) 18 May 1980.

*Primary Examiner*—Fred Zitomer
*Attorney, Agent, or Firm*—Beveridge, DeGrandi, Weilacher & Young

[57] ABSTRACT

Method of metathetical polymerization and copolymerization of cycloalkenes of norbornene type in the presence of catalytic system which is comprised of a) a catalytic precursor prepared by reaction of a tungsten compound containing at least one atom of chlorine, bromine and/or iodine with sterically hindered amines, whereby concentration of the tungsten is 0.01 to 50 milimols per mol of monomer and molar ratio of tungsten/amine is 0.01 to 1:5, b) cocatalyst selected from the group of organic compounds of aluminium, tin, lead, silicon, lithium, magnesium, boron, zinc or germanium, whereby molar ratio tungsten/cocatalyst is 1:1 to 1:20 and possibly, c) moderator of the polymerization reaction selected from the group of ethers, esters, ketons or nitriles in mole ratio cocatalyst/moderator 1:1 to 1:10.

20 Claims, No Drawings

METHOD OF PRODUCTION OF POLYMERS AND COPOLYMERS OF CYCLOALKENE OF NORBORNENE TYPE

FIELD OF THE ART

The invention relates to metathetical polymerization of cycloalkenes of norbornene type by catalysts based on tungsten compounds during injection moulding by RIM (Reaction Injection Moulding) method.

STATE OF THE ART

U. S. Pat. No. 4,400,340 and U. S. Pat. NO. 4,426,502 disclose metathetical polymerization of cycloalkenes by ring opening by the action of a catalytic system containing transition metal. By mixing two streams, of which the first contains catalyst and the second the cocatalyst, cross-linked polymer is obtained containing double bonds in the chain. As catalytic components of the metathetically polymerizing system compounds based on halogenides and oxyhalogenides of tungsten, molybdenum, tantalum or rhenium and tetraalkylammonium salts of tungsten and molybdenum are used. Tungsten and molybdenum salts are preferred, especially $WCl_6$ and $WOCl_4$. But such halides of a transition metals, if added to the mixture of metathetically polymerized monomers, initiate very rapid cationic polymerization. Therefore, they must be in advance suspended in an inert solvent and solubilized by the addition of alcoholic and phenolic compound 5 (called also modifiers). Their activity is thereby decreased. As solvent benzene, toluene, chlorobenzene, dichlorobenzene, etc. are used.

Suitable phenolic compounds are phenol, halogenated phenols and alkylphenols, especially tert-butylphenol, tert-octylphenol and nonylphenol. Molar ratio [tungsten compound ]/[phenolic compound ] ranges from 1:1 to 1:3.

The phenolic component is added to the suspension of the tungsten compound in organic solvent. The reaction is carried under mixing and bubbling by a stream of inert gas to remove the HCl being formed. Alternatively, also phenolic salt can be used, e.g. Li- or Na- phenoxide and the formed inorganic compound is filtered off or centrifuged. All such operations have to be carried out in the absence of air and moisture to prevent deactivation of catalyst (U.S. Pat. Nos. 4,507,453, 4,469,809).

EP 304 900 discloses the use of 2, 6-dihalo- 4-alkylphenol, where the alkyl group contains 1 to 18 carbon atoms; especially suitable is 2, 6-dibromo-4-alkylphenol with 1 to 12 carbon atoms containing alkyl. The catalytic $WCl_6$ and $WOCl_4$ mixture shows high activity and polymerization proceeds very rapidly. A ratio of $WCl_6$ to $WOCl_4$ in the range from 9:1 to 1:3 is used.

To prevent premature reaction of the catalytic precursor with the monomer that forms the first component of the polymerization system, it is necessary to use an inhibitor. Inhibitors are chelating agents or Lewis bases e.g. acetylacetone, alkylesters, tetrahydrofuran, benzonitrile, etc. in the amount 1 to 5 mol/mol of the tungsten compound. As cocatalysts in the metathetical polymerization organometalic compounds are used, i.e. alkyls of metals of the Groups I-III of the periodic system, especially alkylcompounds of aluminium, tin, silicon and zinc. The cocatalyst is dissolved in the norbornene hydrocarbon and forms the second reaction solution.

EP 222 432 and EP 336 486 disclose polymerization of dicyclopentadiene by means of a catalytic system containing:

a) tungsten compound of the general formula

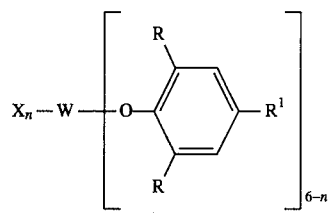

where X is chlorine, R is alkyl group or hydrogen, $R^1$ is alkylgroup with 1 to 10 hydrocarbon atoms or hydrogen, b) compound of the general formula

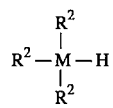

where M is tin or silicon, $R^2$ is alkyl group containing 1–10 carbon atoms or phenyl. In contradiction to organoaluminium compounds, this compound is substantially less sensitive to the presence of oxygen. This means that it is not necessary to work with it in an inert atmosphere.

The polymer is obtained by blending two reaction solutions. One solution contains monomer, catalytic precursor and inhibitor and the other solution contains monomer and cocatalyst. As blending of both solutions results in instantaneous polymerization, which is not desirable in case of RIM equipment application, a so called modifier is added to the latter solution. Usually Lewis bases, e.g. ethers, esters, nitriles, etc. are used (EP 280 247). EP 259 215 describes polymerization without the use of moderator. The induction period of this catalytic system can fluctuate in the range 1–20 minutes, what is technologically optimal.

EP 385 274 discloses as catalyst a tungsten compound of the general formula

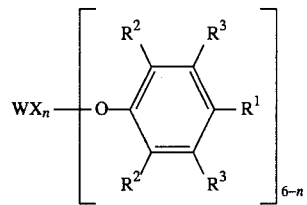

where X is chlorine or bromine, n=2 or 3, $R^1$ is alkyl group having 1–10 atoms, alkoxy group having 1–8 atoms or phenyl, hydrogen or chlorine; $R^2$ is alkyl group having 1–10 carbon atoms or hydrogen and $R^3$ is alkyl group having 1–10 carbon atoms or hydrogen. From the mixture of tungsten compounds reacted to different degrees, the one that is stable in the air is separated. But this operation is considered a complication and results in losses of tungsten compound. The organometallic compound used in this case is tributyltinhydride.

The disclosed phenolic modifiers are well applicable in the polymerization of norbornenic monomers, but owing to small differences in chemical structure they do not allow greater modification of catalytic system properties.

Catalysts based on unmodified tungsten compounds polymerize the monomer at a high rate which is technologically undesirable. Modified catalysts based on $WCl_6$, where chlorine is substituted by a phenolic compound in a low degree, are sufficiently active in polymerization, but they form solutions of low stability with monomer and easily react also with atmospheric oxygen, this being accompanied by deactivation. If reaction with a phenolic derivative is carried out up to the higher degree by using a higher ratio of the phenolic compound to $WCl_6$, catalyst stability is increased but at the same time its activity is also decreased. In an extreme case, when $WCl_6$ is reacted to such a degree that the resulting product is in reality inert to atmospheric oxygen, the decrease in the activity is so high that it results in substantial deterioration of polymeric material properties. Now, it has been surprisingly found that sterically hindered amines that form nitroxile radicals and are known by the abbreviation HALS (Hindered Amine Light Stabilizer) of general formula

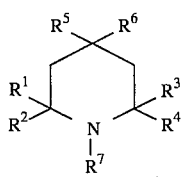

1)

where $R^{1-4}$ are identical or different alkyl groups with 1–6 hydrocarbon atoms; $R^5$ is OH, COOR', CN, NHR'. NR'R", CONHR' (where R' and R" are alkyls with 1 to 18 carbon atoms) or heterocycle with N, O or S in ring; $R^6$ can be hydrogen or chemical bond connected with $R^5$ to a heterocycle; $R^7$ is hydrogen, alkyl group with 1 to 18 carbon atoms or monoethylsuccinyl,

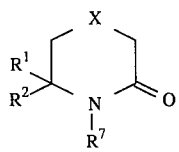

2)

where X is O, S, NR or CO; $R^{1-2}$ are identical or different alkyl groups with 1–6 carbon atoms; $R^7$ is hydrocarbon, alkylgroup with 1 to 18 carbon atoms or monoethylsuccinyl,

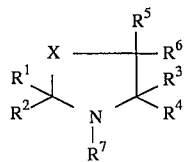

3)

where X is O, S, NR or CO; $R^{1-4}$ are identical or different alkyl groups with 1 to 6 carbon atoms; $R^{5,6}$ are hydrogen atoms, groups COOR, NHR, NRR', CN, OH, CONHR (where R and R' are alkyls with 1 to 18 carbon atoms) or heterocycles with O, S, N in ring and $R^7$ is hydrocarbon, alkylgroup with 1 to 18 hydrocarbon atoms or monoethylsuccinyl, are very advantageous modifiers as they remove a number of existing technological problems.

SUBJECT OF THE INVENTION

Subject of the invention is a method of metathetical polymerization of cycloolefins of norbornene type by the application of sterically hindered amines as modifiers of the catalytic tungsten compounds.

The subject matter of this invention concerns at least one monomer containing at least one norbornene group is polymerized in the presence of a catalytic precursor prepared by reaction of at least one tungsten compound containing chlorine, bromine and/or iodine with at least one compound containing sterically hindered aminogroup, cocatalyst selected from the group of organic compounds of aluminium, tin, lead, silicon, lithium, magnesium, borone, zinc and/or germanium.

To prepare the catalytic precursor at least one tungsten compound of general formula [I]

is used, where O is oxygen; x is chlorine, bromine or iodine; a is an integer 0 or 1; b is an integer 4 or 6, the concentration of this compound being 0.01 to 50 millimols per mol of monomer.

In the preparation of the catalytic precursor the following is used as a compound containing sterically hindered aminogroup:

a) at least one compound of general formula [II]

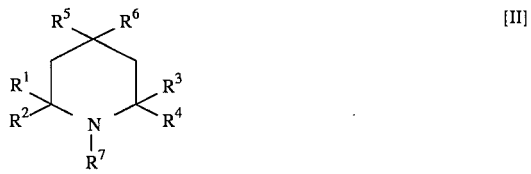

where $R^{1-4}$ are identical or different alkyl groups with 1–6 atoms; $R^5$ is OH, COOR', CN, NHR'. NR'R", CONHR' (where R' and R" are alkyls with 1 to 18 carbon atoms) or heterocycle with N, O or S in the ring; $R^6$ can be hydrogen or a chemical bond connected with $R^5$ to a heterocycle.; $R^7$ is hydrogen, alkylgroup with 1 to 18 carbon atoms or monoethylsuccinyl; and/or b) compound of general formula [III]

where X is O, S NR or CO; $R^{1-2}$ are identical or different alkyl groups with 1–6 carbon atoms; $R^7$ is hydrocarbon, alkylgroup with 1 to 18 carbon atoms or monoethylsuccinyl; and/or c) compound of general formula [IV]

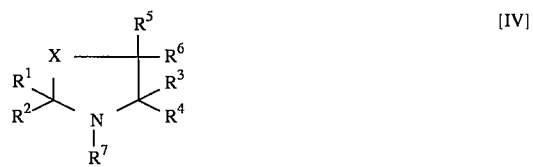

where X is O, S, NR or CO; $R^{1-4}$ are identical or different alkyl groups with 1 to 6 carbon atoms; $R^{5,6}$ are hydrogen atoms, groups COOR, NHR, NRR', CN, OH, CONHR (where R and R' are alkyls with 1 to 18 carbon atoms) or heterocycles with O, S, N in ring and $R^7$ is, alkylgroup with 1 to 18 carbon atoms or succinyl, the mole ratio [tungsten]/ [amine]being 0.010 to 1:5.

As cocatalyst organometalic compound of general formula [IV]

$$R_mM_nH_pX_q \qquad [V]$$

is used
where R are identical or different and mean alkyl, alkenyl, alkoxy, aryl, aryloxy and alkarylgroups, saturated or unsaturated cyclic compounds with 1 to 14 carbon atoms; M is tin, lead, silicon, lithium, magnesium, boron, zinc, germanium or possibly a mixture of such elements; H is hydrogen, X is chlorine, bromine and/or iodine; m is 1 to 6, n is 1 or 2, p is 0 to 3, q is 0 or 1, where the mole ratio [tungsten compound]/[cocatalyst] is in the range 1:1 to 1:20.

Solution of cocatalyst contains as moderator at least one compound selected from the group consisting of ethers, esters, ketons or nitriles in a mole ratio [cocatalyst]/[moderator]1:1 to 1:10, preferably n-butyl ether, diisopropylether, diisopropylketon and/or diglyme.

The monomer contains at least one norbornene group of general formula [VI]

[VI]

which is selected from the group consisting of substituted and unsubstituted norbornens, dicyclopentadiens, dihydrodicyclopentadiens, trimers of dicyclopentadienes, tetramers of cyclopentadienes, tetracyclododecenes, hexacyclododecenes, ethylidennorbornenes, vinylnorbornenes or mixtures, thereof whereby substituents of said monomers are alkyls with one or two carbon atoms.

The mixture of monomers contains up to 20% wt of vinylic monomer that does not contain norbornene group. The mixture of monomers contains 0.1 to 20% wt of monomer of general formula [VII]

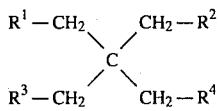
[VII]

where $R^{1,2}$ is norbornenecarboxyl; $R^3$ is norbornenecarboxyl, hydrogen or OH; $R^4$ is hydrogen or OH.

Solutions of catalytic precursor, cocatalyst and monomer are transferred as separate streams and their mixing is carried out before filling into a mould having the desired semi product or product shape.

Cocatalyst is dosed together with monomer as one stream.

In the preparation of catalytic presursor and diluting of cocatalyst, cycloolefinic monomer of nonbornene type is used, possibly in a mixture with vinylic monomer.

In the preparation of catalytic presursor and diluting of cocatalyst, inert solvent is used which is selected from the group consisting of benzene, toluene, xylene, chlorobenzene, trichlorobenzene, pentane, heptane, oktane and their mixture.

Into any of the streams is admixed 0.01 to 2% wt of light stabilizers and/or antioxidants, 2 to 30% wt of blowing agents, 0.01 to 8% wt of dispergators, 0.01 to 20% wt of pigments, 1 to 75% wt of fillers, 0.1 to 5% wt of elastomers or their mixtures thereof.

As filler, ground calcium carbonate, ground dolomite, ground slate, aluminium oxide, silicon oxide, aluminium hydroxide, magnesium hydroxide, ground talc, kaolin, asbestos, mica, glass fibres, natural or synthetic fibres, carbon black, iron trioxide, wood flour or mixures thereof is used. In any of the streams is dissolved 0.1 to 5% wt of an additive from the group consisting of elastomers polyisoprene, polybutadiene, polychloroprene, styrenebutadiene copolymer, butadiene-acrylonitrile copolymer, ethylen-propylene copolymer, butyl rubber or mixtures thereof.

The polymer in the shape of the final product is thermally stabilized at a temperature of 50° to 350° C. for the period of 5 to 120 minutes.

As has already been mentioned, in most cases chelating agents or Lewis bases have to be added to the solution of tungsten compound to prevent premature monomer polymerization. But the hindered amines used according to this invention are Lewis bases themselves. The reaction solution containing monomer and catalytic component modified by a hindered amine according to this invention is sufficiently stable and does not polymerize spontaneously. Even after 48 hours exposition to the atmospheric oxygen and moisture the polymerization solution keeps its high activity and after it has been heated up to 80° C. it polymerizes (see examples No. 15 and 17).

A serious drawback is usually the unpleasant smell of polymers caused by unreacted monomer. It has been found that some catalyst types prepared by means of modifiers according to this invention provide polymers with substantially less smell. Moreover, discoloration is also negligible which is an advantage for products of light colour tinge or in some special applications, e.g. in optics. Not in the least, new possibilities are also opened in controlling the ratio of gelling time / reaction time that reaches by the phenolic modifiers the value about 0.1 and is a disadvantage in the RIM technology.

The most preferable compounds of tungsten for preparation of the catalytic precursors in combination with the above mentioned compounds are $WCl_6$ and/or $WOCl_4$ or eventually their mixture.

The starting material in preparation of the catalytic solution is the suspension of tungsten compound in a small quantity of a suitable solvent. The solvent must not react with the tungsten compounds; e.g. benzene, toluene chlorobenyene, dichlorobenzene, trichlorobenzene, hexane, etc. are used. Concentration of the tungsten compound is somewhere in the range of 0.1 to 0.7 mol/l of the solvent. A modification of tungsten compound is carried out by addition of the solution of the hindered amine in the same solvent as is the one used in the suspension preparation.

Preferable aminocompounds are:

2,2,6,6-tetramethyl-4-hydroxy-4-cyanopiperidine, 2,2,6,6-tetramethyl-4-stearoylpiperidine, 2,2,6,6-tetramethyl-4-hydroxy-4-aminocarbonylpiperidine, 2,2,6,6-tetramethyl-4-oximinopiperidine, poly-[2-{N,N -di(2,2,6,6-tetramethyl-4-piperidyl)hexanediamino}-4-{amino-1,1,3,3-tetramethybutyl}symtriazine]:

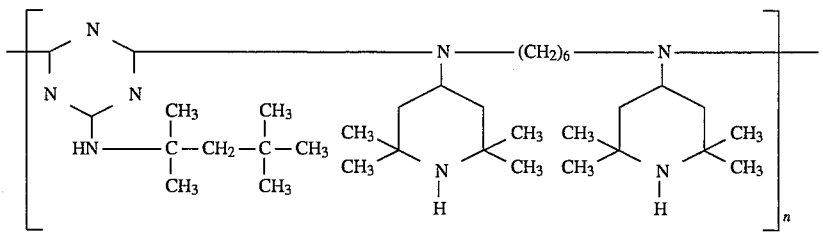

bis-(2,2,6,6-tetramethyl)-4-piperidylsebacate,

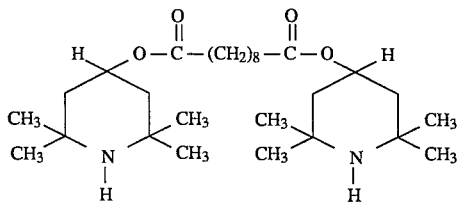

poly-(N-β-hydroxyethyl)-2,2,6,6-tetramethyl-4-hydroxypiperidylsuccinate

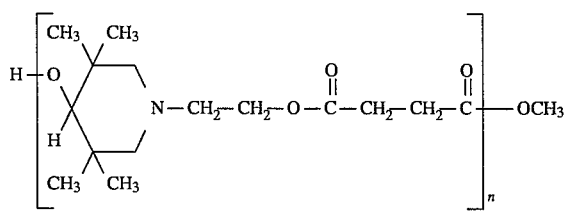

o-4-[morpholine-4-yl]-sym-triazine

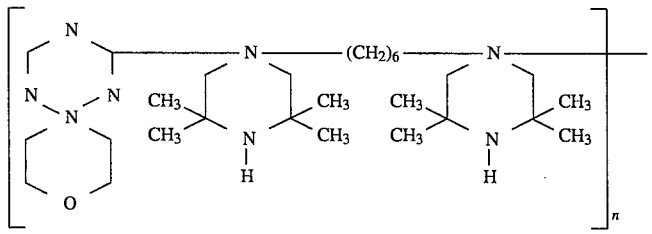

in molar ratio [tungsten compound]/[hindered amine] approximately 1:0.015 to 1:5.

The second part of the polymerization system contains a mixture of monomer with initiator. A suitable initiator is trialkylaluminium, dialkylaluminiumhalogenide, alkylaluminium-dihalogenide or mixtures thereof (whereby alkyl contains 1–12 carbon atoms), and/or organic tin compounds of general formula $R_3SnH$ (where R is alkylgroup with 1–10 carbon atoms or phenyl). The most suitable molar ratio of diethylaluminiumchloride to monomer is 1:100 to 1:2000. Molar ratio of the tungsten compound to the initiator ranges from 1:2 to 1:20.

To set required initiation periods, moderators are added to this solution. Moderators are ethers, esters, ketons or nitriles in molar ratio [organoaluminium compound]/[moderator] from 1:1 to 1:5. The course of polymerization and polymer properties-can be controlled also by the addition of suitable activators (e.g. alcohols, epichlorohydrin, tetrahydrofuran, etc.) and additives, e.g. fillers (glass fibres, mica, wollastonite, carbon black, talc, calcium carbonate, etc.), elastomers (natural rubber, butyl rubber, polyisoprene, ethyl-propylene copolymer, etc.) pigments, plasticizers, foaming agents, flame retardants, light stabilizers and antioxidants. Such additives are added to one or to both solutions. The invention is further illustrated by the following examples.

EMBODIMENTS OF THE INVENTION

Abbreviations used in the specification of invention:
CPD cyclopentadiene
DCPD dicyclopentadiene
DEAC diethylaluminiumchloride

EXAMPLE 1

A solution containing 1.23 g of 2,2,6,6-tetramethyl-4-hydroxy-4-aminocarbonylpiperidine in 300 ml of toluene was gradually added by syringe to a suspension of $WCl_6$ in 50 ml toluene containing $6.163 \cdot 10^{-3}$ mol of tungsten. Consequently, the molar ratio of both components in the course of reaction was 1:1. Toluene used as solvent was stripped by dry nitrogen and distilled under vacuum above natrium. The solution obtained was bubbled by inert gas for several hours to remove liberated HCl. Tungstic component concentration in the so prepared solution of catalytic precursor was about 0.1M.

EXAMPLE 2

A solution containing 0.28 g of 2,2,6,6-tetramethyl-4-hydroxy-4-cyanopiperidine in 35 ml of toluene was admixed as in Example 1 to 50 ml of a $WCl_6$ suspension in toluene containing $6.163 \cdot 10^{-3}$ mol of tungsten. Molar ratio of both components was 1:0.25. Concentration of tungsten component in the so prepared solution of catalytic precursor was 0.1M. The method of toluene drying and HCl removal from the reaction mixture were identical as that in example 1.

EXAMPLE 3

A solution containing 5.21 g of 2,2,6,6-tetramethy-4-stearoyl-oxypiperidine in 20 ml of toluene was admixed as in Example 1 to 50 ml of a $WCl_6$ suspension in toluene containing $6.163.10^{-3}$ mol of tungsten. Molar ratio of tungsten to modifier was 1:2. Concentration of the tungsten component in the solution of catalytic precursor was approximately 0.1M. The method of toluene drying and HCl removal from the reaction mixture were identical as that in example 1.

EXAMPLE 4

A solution containing 1.30 g of 2,2,6,6-tetramethyl-4-stearoyl-oxypiperidine in 5 ml of toluene was admixed as in Example 1 to 50 ml of a $WCl_6$ suspension in toluene containing $6.163.10^{-3}$ mol of tungsten. Molar ratio of tungsten to modifier was 1:0.5. Concentration of the tungsten component in the solution of catalytic precursor was approximately 0.1M. The method of toluene drying and HCl removal from the reaction mixture were identical as that in Example 1.

EXAMPLE 5

A solution containing 0,244 g of 2,2,6,6-tetramethyl-4-oximinopiperidine in 75 ml of toluene was admixed as in example 1 to 50 ml of a $WCl_6$ suspension in toluene containing $6.163.10^{-3}$ mol of tungsten. Molar ratio of both components was 1:0.2. Concentration of the tungsten component in the solution of catalytic precursor was approximately 0.1M. The method of toluene drying and HCl removal from the reaction mixture were identical as that in example 1.

EXAMPLE 6

A solution containing 0,25 g of bis-[1,2,2,6,6-pentamethyl-piperidine-4-yl]-sebacate in 67 ml of toluene was admixed gradually by a syringe to 50 ml of a $WCl_6$ suspension in toluene containing $6.163.10^{-3}$ mol of tungsten. Molar ratio of both components during the reaction was 1:0.1. The solution obtained was bubbled by inert gas for several hours to remove the liberated HCl. Concentration of the tungsten component in the so prepared solution of catalytic precursor was approximately 0.1M. The method of toluene drying and HCl removal from the reaction mixture were identical as that in example 1.

EXAMPLE 7

Under inert atmosphere, 0.73 ml of the solution of catalytic precursor prepared according to example 1 was admixed to 10 ml of dicyclopentadiene (DCPD) in a special test tube. 4 ml of this mixture was admixed to 4 ml of the solvent containing 0.13 ml of 1.888M solution of DEAC and 0.105 ml of di-n-buthylether as moderator, in DCPD. Exact admixing of the moderator was carried out by a dosing syringe. Molar ratio DCPD:W:DEAC:moderator after admixture of both solutions was 2000:1:8:20. Immediately, this mixture was shaken shortly but intensively. At the laboratory temperature, polymerisation was not initiated (gel formation) not even after 10 minutes. After immersion into a bath heated up to 60° C. the reaction commenced rapidly; maximum temperature of the polymerizing mixture, indicated by a thermocouple, was reached within 50 s. A hard, nonsoluble polymer was formed and conversion, determined gravimetrically (15 minutes at 175° C.) was 97.8%

EXAMPLE 8

Under inert atmosphere, 0.73 ml of the solution of catalytic precursor prepared according to example 2 was admixed to 10 ml of dicyclopentadiene (DCPD) in a special test tube. 4 ml of this mixture was admixed to 4 ml of the solvent containing 0.13 ml of 1.888M solution of DEAC in toluene and 0.105 ml of di-n-butylether as moderator, in DCPD. By polymerization at laboratory temperature a hard, nonsoluble polymer was formed. Maximal temperature of the polymerizing mixture was obtained within 50 s after the solutions had been mixed.

EXAMPLE 9

Under inert atmosphere, 0.73 ml of the solution of catalytic precursor prepared according to example 3 was admixed to 10 ml of dicyclopentadiene (DCPD) in a special test tube. 4 ml of this mixture was admixed to 4 ml of the solvent containing 0.13 ml of 1.888M solution of DEAC and 0.105 ml of di-n-butylether as moderator, in DCPD. Polymerization was carried out at 60° C. Maximal temperature was reached within 50 s after the solutions had been mixed. Conversion was 99.5% and glass transition temperature (measured by DSC method) 110° C. were reached.

EXAMPLE 10

Under inert atmosphere, 0.73 ml of the precursor solution prepared according to Example 4 was admixed in a special tube to 10 ml of DCPD containing 8% of pentaerythritol-tris-(bicyclo[2,2,1]hept-2-en)-5-carboxylate, which being a conomer prepared by reaction of pentaerythritolacrylate with CPD, that was generated by dissociation of DCPD at its boiling point, i.e. 175° C. 4 ml of this mixture was admixed to 4 ml of the solvent containing 0.13 ml of 1.888M solution of DEAC and 0.105 ml of di-n-butylether as moderator, in DCPD. Polymerisation did not run at laboratory temperature. At the temperature 80° C. the polymerization was virtually finished within 120 s.

EXAMPLE 11

(Comparative Experiment to Example 10)

In this example $WCl_6$ modified by p-tert-butylphenol in molar ratio 1:1 according to U. S. Pat. No. 4,400,340 was used as catalytic precursor. Tungsten concentration in catalytic precursor and monomer composition were the same as in the Example 10. The polymerisation did not run at laboratory temperature.

EXAMPLE 12

(Comparative Experiment)

Under conditions specified in Example 11 but at ⅓ higher concentration of the catalytic precursor and cocatalyst, only thin gel was obtained after 15 minutes of polymerization at 80° C.

EXAMPLE 13

(Comparative Experiment)

Under conditions specified in Example 11 but at comonomer content decreased to ½ (i.e. to 4% wt) polymerization runs at 80° C. and maximum temperature of polymerization mixture was obtained after 450 s.

EXAMPLE 14

(Comparative Experiment)

Under conditions specified in Example 13 but with by ⅓ increased amount of catalytic precursor and cocatalyst, the maximum temperature was reached after 140 s.

EXAMPLE 15

Precursor prepared according to the Example 3 was left in the test tube under air access for 48 hours. 4 ml of the solution containing 0.13 ml of 1.888M DEAC solution and 0.105 ml of di-n-butyl-ether solution as moderator, in DCPD. Molar ratio DCPD:W:DEAC:moderator was 2000:1:8:20. Polymerization did not run at the laboratory temperature within a reasonable time, but at 70° C. the maximum polymerization temperature was reached within 70 s after the reactor was immersed in a thermostating bath. Conversion was 99.67%

EXAMPLE 16

Under inert atmosphere, 0.73 ml of the solution of catalytic precursor prepared according to Example 4 was admixed to 10 ml of dicyclopentadiene (DCPD) in a special test tube. 4 ml of the solvent containing 0.13 ml of 1.888M DEAC solution and 0.105 ml of di-n-butylether as moderator, in DCPD. Molar ratio DCPD:W:DEAC:moderator was 2000:1:8:20. By polymerization at laboratory temperature gel was formed after 60 s. Maximal temperature was reached within 220 s.

EXAMPLE 17

Catalytic precursor prepared according to the Example 4 was left in a test tube air access for 48 hours and thereafter used to prepare reaction solution. Molar ratio DCPD:W:DEAC:moderator in the polymerization test was 3000:1:5:5. In polymerization at laboratory temperature gel was formed within 100 s and maximum temperature was reached within 460 s. Conversion was 98.4%.

EXAMPLE 18

Under inert atmosphere, 0.73 ml of the solution of catalytic precursor prepared according to Example 5 was admixed to 10 ml of dicyclopentadiene (DCPD) in a special test tube. By polymerization at laboratory temperature maximum temperature was reached within 60 s. Light coloured and soft polymer was obtained.

EXAMPLE 19

(Comparative Experiment)

Under conditions specified in Example 18 but at polymerization temperature 80° C. the maximum temperature was reached within 10 s. Light coloured and hard polymer was obtained. Conversion was 99.53%.

EXAMPLE 20

Under inert atmosphere, 0.73 ml of the solution of catalytic precursor prepared according to example 6 was admixed to 10 ml of dicyclopentadiene (DCPD) in a special test tube. 4 ml of this mixture was added to 4 ml of the solvent containing 0.13 ml of 1.888M DEAC solution and 0.105 ml of di-n-butylether as moderator, in DCPD. Molar ratio DCPD:W: DEAC:moderator after admixing both solutions was 2000:1:8: 20. The mixture was immediately shortly but intensively shaken. At laboratory temperature gel was formed after 50 s. After immersing in a bath heated up to 60° C. the reaction started quickly; maximum temperature of polymerization mixture, indicated by a thermocouple, was reached within 140 s.

EXAMPLE 21

Under inert atmosphere, 0.73 ml of the solution of catalytic precursor prepared according to example 6 was admixed to 10 ml of dicyclopentadiene (DCPD) in a special test tube. 4 ml of this mixture was added to 4 ml of the solvent containing 0.13 ml of 1.888M DEAC solution and 0.088 ml of diisopropylether as moderator, in DCPD. Moderator was dosed by a microsyringe. Molar ratio DCPD:W:DEAC:moderator after admixing both solutions was 2000:1:8: 20. The mixture was immediately shortly but intensively shaken and the test tube was immersed in 60° C. warm bath. Maximal temperature was reached within 130 s after the reactor was immersed into the thermostating bath.

EXAMPLE 22

Under inert atmosphere, 0.73 ml of the solution of catalytic precursor prepared according to example 6 was admixed to 10 ml of dicyclopentadiene (DCPD) in a special test tube. 4 ml of this mixture was added to 4 ml of the solvent containing 0.13 ml of 1.888M DEAC solution and 0.087 ml of diisopropylketone as moderator, in DCPD. Moderator was dosed by a syringe. Molar ratio DCPD:W:DEAC:moderator after admixing both solutions was 2000:1:8: 20. The mixture was immediately shortly but intensively shaken and the test tube was immersed in a 60° C. warm bath. Polymerization was carried out at 60° C. Maximal temperature was reached within 270s after the reactor was immersed into the thermostating bath.

EXAMPLE 23

Example 8 was repeated with the exception that hexane was used as cocatalyst diluent. Polymerization course and polymer properties were practically identical with those of the Example 8.

EXAMPLE 24

Polymerization test simulating RIM technique was carried out using catalytic system according to Example 3 as follows:

600 ml of catalytic precursor solution according to example 3 and 600 ml of cocatalyst, containing 19.5 ml of 1.888M DEAC solution and 13.2 ml diglyme (diethylenglycoldimethylether) as moderator, in DCPD was charged in two tempered storage vessels with volume 1000 ml. Molar ratio of DCPD:W:DEAC:moderator was 2000:1:8:20. Solutions were pumped from storage vessels to a mixing head and from this head injected to glass moulds previously dried in a drier. Dimensions of moulded pieces were 180×160×4 mm. Temperature of polymerization solutions before mixing was 26° C., polymerization temperature was 60° C., reaction time was 30 s.

The following properties were determined on the moulded pieces:

| | |
|---|---|
| Tensile strength | 46.2 MPa |
| Elongation | 3.8% |
| Modulus of elasticity in tension | 1910.0 MPa |
| Heat deflection temperature | |
| (1.80 MPa) | 78.0° C. |
| (0.45 MPa) | 82.0° C. |
| Hardness | 81.3 Sh D |

Industrial Applications

Metathetical polymerization and copolymerization of cycloalkenes norbornene type or of a mixture with vinyl monomers and other additives is used in reaction injection moulding (RIM) production of thin-walled products or semi-products of complicated shape. The principal application fields are:

production of automobile body parts where surface treatment by baking enamels is carried out, thermally stressed parts of complicated shape in the electronic industry, boards for printed circuit boards, etc.

We claim:

1. A method of producing polymers and copolymers of cycloalkenes containing at least one norbornene group by metathetical polymerization in the presence of catalysts based on tungsten compounds, said method comprising polymerizing a mixture comprising at least one monomer containing at least one norbornene group in the presence of a catalytic precursor and a solution of a co-catalyst selected from the group consisting of organic compounds of aluminum, tin, lead, silicon, lithium, magnesium, boron, zinc, germanium and mixtures thereof, said catalytic precursor prepared by reacting at least one tungsten compound containing chlorine, bromine, iodine or mixtures thereof with at least one compound containing sterically hindered aminogroup to form a modified tungsten compound, wherein said compound containing sterically hindered aminogroup is at least one member selected from the group consisting of (a) at least one compound of formula (II)

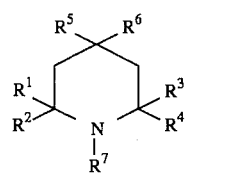
(II)

where $R^{1-4}$ are identical or different alkyl groups with 1–6 carbon atoms; $R^5$ is OH, COOR', CN, NHR', NR'R", CONHR' or a heterocycle with N, O or S in the ring, wherein R' and R" are alkyls with 1 to 18 carbon atoms; $R^6$ can be hydrogen or a chemical bond connected with $R^5$ to a heterocycle; $R^7$ is hydrogen, alkyl group with 1 to 18 carbon atoms or monoethylsuccinyl;.

(b) a compound of formula (III)

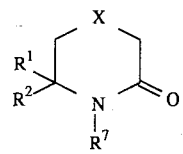
(III)

where X is O, S, NR or CO; $R^{1-2}$ are identical or different alkyl groups with 1–6 carbon atoms; $R^7$ is hydrocarbon, alkyl group with 1 to 18 carbon atoms or monoethylsuccinyl;

(c) a compound of formula (IV)

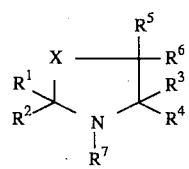
(IV)

where X is O, S, NR or CO; $R^{1-4}$ are identical or different alkyl groups with 1 to 6 carbon atoms; $R^{5-6}$ are hydrogen atoms, COOR, NHR, NRR', CN, OH, CONHR or a heterocycle with O, S, N in the ring, wherein R and R' are alkyls with 1 to 18 carbon atoms; and $R^7$ is alkyl group with 1 to 18 carbon atoms or monoethylsuccinyl; whereby the mole ratio tungsten/amine is 0.010 to 1:5.

2. The method according to claim 1 wherein said catalytic precursor is at least one tungsten compound of formula (I)

$$WO_aX_b \quad (I)$$

where X is chlorine, bromine or iodine; a is integer number 0 or 1; b is integer number 4 or 6; whereby the concentration of said catalytic precursor is 0.01 to 50 millimols per mol of said monomer containing at least one norbornene group.

3. The method according to claim 1 wherein said cocatalyst is a organometallic compound of formula (V)

$$R_mM_nH_pX_q \quad (V)$$

where R are identical or different and represent alkyl, alkenyl, alkoxy, aryl, aryloxy or alkaryl groups, or saturated or unsaturated cyclic compounds with 1 to 14 carbon atoms; M is tin, lead, silicon, lithium, magnesium, boron, zinc, germanium or mixtures thereof; H is hydrogen, X is chlorine, bromine, iodine or mixtures thereof; m is 1 to 6, n is 1 or 2, p is 0 to 3, q is 0 or 1, whereby the mole ratio tungsten compound/co-catalyst is in the range 1:1 to 1: 20.

4. The method according to claim 1 wherein said solution of a co-catalyst further comprises at least one moderator selected from the group consisting of ethers, esters, ketones and nitriles in a mole ratio co-catalyst/moderator of 1:1 to 1:10.

5. The method according to claim 1 wherein said monomer containing at least one norbornene group comprises at least one norbornene group of formula (VI)

(VI)

and is selected from the group consisting of substituted and unsubstituted norbornenes, dicyclopentadienes, dihydrodicyclopentadienes, trimers of dicyclopentadienes, tetramers of cyclopentadienes, tetracyclododecenes, hexacyclododecenes, ethylidennorbornenes, vinylnorbornenes, and mixtures thereof, whereby the substituents of said monomers are alkyls with one to two carbon atoms.

6. The method according to claim 1 wherein said mixture further comprises up to 20% wt of a vinylic monomer that does not contain a norbornene group.

7. The method according to claim 1 wherein said mixture comprises 0.1 to 20% wt of monomer of formula (VII)

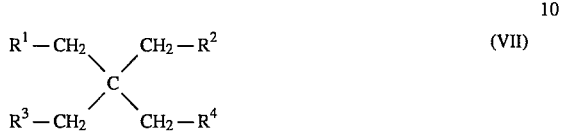

where $R^{1,2}$ is norbornenecarboxyl; $R^3$ is norbornenecarboxyl, hydrogen or OH; and $R^4$ is hydrogen or OH.

8. The method according to claim 1 wherein said mixture, catalytic precursor, and solution of a co-catalyst are transferred as separate streams and the mixing thereof is carried out before filling into a mould having the desired semi-product or product shape.

9. The method according to claim 1 wherein said solution of a co-catalyst is dosed together with said mixture as one stream.

10. The method according to claim 1 wherein said mixture comprises a cycloolefinic monomer of norbornene type optionally in a mixture with a vinylic monomer.

11. The method according to claim 1 wherein an inert solvent selected from the group consisting of benzene, toluene, xylene, chlorobenzene, dichlorobenzene, trichlorobenzene, pentane, heptane, octane and mixtures thereof is utilized in the preparation of said catalytic precursor and the dilution of said solution of a co-catalyst.

12. The method according to claim 8 further comprising admixing into at least one of said streams 0.01 to 2% wt of light stabilizers and/or antioxidants, 2 to 30% wt of blowing agents, 0.01 to 8% wt of dispersing agents, 0.01 to 20% wt of pigments, 1 to 75% of fillers, 0.1 to 5% wt of an elastomer or mixtures thereof.

13. The method according to claim 11 which comprises utilizing as a filler at least one member selected from the group consisting of ground calcium carbonate, ground dolomite, ground slate, aluminum oxide, silicon oxide, aluminum hydroxide, magnesium hydroxide, ground talc, kaolin, asbestos, mica, glass fibers, natural or synthetic fibers, carbon black, iron trioxide, wood flour, and mixtures thereof.

14. The method according to claim 8 further comprising dissolving into at least one of said streams 0.1 to 5% wt of an additive selected from the group consisting of elastomers of polyisoprene, polybutadiene, polychloroprene, styrene-butadiene copolymer, butadiene-acrylonitrile copolymer, ethylene-propylene copolymer, butyl rubber and mixtures thereof.

15. The method according to claim 1 wherein said polymer in the shape of the final product is thermally stabilized at a temperature of from 50° to 350° C. for 5 to 120 minutes.

16. The method according to claim 4 wherein said moderator is selected from the group consisting of n-butyl ether, diisopropylether, diisopropylketone, diglyme and mixtures thereof.

17. A modified tungsten catalyst for producing polymers and copolymers of cycloalkenes containing at least one norbornene group, said catalyst prepared by a method comprising reacting at least one tungsten compound containing chlorine, bromine, iodine or mixtures thereof with at least one compound containing sterically hindered aminogroup, wherein said compound containing sterically hindered aminogroup is at least one member selected from the group consisting of (a) at least one compound of formula (II)

where $R^{1-4}$ are identical or different alkyl groups with 1–6 carbon atoms; $R^5$ is OH, COOR', CN, NHR', NR'R", CONHR' or a heterocycle with N, O or S in the ring, wherein R' and R" are alkyls with 1 to 18 carbon atoms; $R^6$ can be hydrogen or a chemical bond connected with $R^5$ to a heterocycle; $R^7$ is hydrogen, alkyl group with 1 to 18 carbon atoms or monoethylsuccinyl;

(b) a compound of formula (III)

where X is O, S, NR or CO; $R^{1-2}$ are identical or different alkyl groups with 1–6 carbon atoms; $R^7$ is hydrocarbon, alkyl group with 1 to 18 carbon atoms or monoethylsuccinyl;

(c) a compound of formula (IV)

where X is O, S, NR or CO; $R^{1-4}$ are identical or different alkyl groups with 1 to 6 carbon atoms; $R^{5-6}$ are hydrogen atoms, COOR, NHR, NRR', CN, OH, CONHR or a heterocycle with O, S, N in the ring, wherein R and R' are alkyls with 1 to 18 carbon atoms; and $R^7$ is alkyl group with 1 to 18 carbon atoms or monoethylsuccinyl; whereby the mole ratio tungsten/amine is 0.010 to 1:5.

18. The catalyst according to claim 1, wherein said tungsten compound is a compound of formula (I)

where X is chlorine, bromine or iodine; a is integer number 0 or 1; b is integer number 4 or 6.

19. A method of making a modified tungsten catalyst for producing polymers and copolymers of cycloalkenes containing at least one norbornene group, said method comprising reacting at least one tungsten compound containing chlorine, bromine, iodine or mixtures thereof with at least one compound containing sterically hindered aminogroup, wherein said compound containing sterically hindered aminogroup is at least one member selected from the group consisting of (a) at least one compound of formula (II)

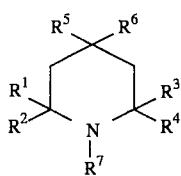
(II)

where $R^{1-4}$ are identical or different alkyl groups with 1–6 carbon atoms; $R^5$ is OH, COOR', CN, NHR', NR'R", CONHR' or a heterocycle with N, O or S in the ring, wherein R' and R" are alkyls with 1 to 18 carbon atoms; $R^6$ can be hydrogen or a chemical bond connected with $R^5$ to a heterocycle; $R^7$ is hydrogen, alkyl group with 1 to 18 carbon atoms or monoethylsuccinyl;

(b) a compound of formula (III)

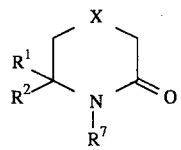
(III)

where X is O, S, NR or CO; $R^{1-2}$ are identical or different alkyl groups with 1–6 carbon atoms; $R^7$ is hydrocarbon, alkyl group with 1 to 18 carbon atoms or monoethylsuccinyl;

(c) a compound of formula (IV)

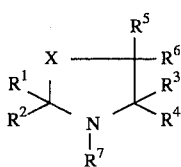
(IV)

where X is O, S, NR or CO; $R^{1-4}$ are identical or different alkyl groups with 1 to 6 carbon atoms; $R^{5-6}$ are hydrogen atoms, COOR, NHR, NRR', CN, OH, CONHR or a heterocycle with O, S, N in the ring, wherein R and R' are alkyls with 1 to 18 carbon atoms; and $R^7$ is alkyl group with 1 to 18 carbon atoms or monoethylsuccinyl; whereby the mole ratio tungsten/amine is 0.010 to 1:5.

20. The method according to claim 19, wherein said tungsten compound is a compound of formula (I)

$$WO_aX_b \qquad (I)$$

where X is chlorine, bromine or iodine; a is integer number 0 or 1; b is integer number 4 or 6.

* * * * *

UNITED STATES PATENT AND TRADEMARK OFFICE
CERTIFICATE OF CORRECTION

PATENT NO. : 5,455,318
DATED : October 3, 1995
INVENTOR(S) : Stohandle, et. al.

It is certified that error appears in the above-indentified patent and that said Letters Patent is hereby corrected as shown below:

Title page, item [75], inventor: Delete "Jiri Onduj" and insert--
Jiri Ondruj--.
Delete "CZECHOSLOVAKIA" and insert --CZECH REPUBLIC--.

Title page, item [73], Assignee: Delete "CZECHOSLOVAKIA" and insert--
CZECH REPUBLIC--.

Signed and Sealed this

Second Day of January, 1996

Attest:

BRUCE LEHMAN

*Attesting Officer*     *Commissioner of Patents and Trademarks*